US 6,668,644 B2

(12) United States Patent
Hall

(10) Patent No.: US 6,668,644 B2
(45) Date of Patent: Dec. 30, 2003

(54) ADJUSTABLE METER LOOP ASSEMBLY

(75) Inventor: Howard W. Hall, Shawnee, OK (US)

(73) Assignee: Uponor Aldyl Co., Shawnee, OK (US)

( * ) Notice: Subject to any disclaimer, the term of this patent is extended or adjusted under 35 U.S.C. 154(b) by 62 days.

(21) Appl. No.: 10/052,660

(22) Filed: Jan. 18, 2002

(65) Prior Publication Data

US 2003/0136188 A1 Jul. 24, 2003

(51) Int. Cl.$^7$ ............................................. G01F 15/14
(52) U.S. Cl. ...................................................... 73/273
(58) Field of Search .......................... 73/273, 201, 856; 285/30, 124.1; 137/15; 403/362; 248/74.4, 68.1

(56) References Cited

U.S. PATENT DOCUMENTS

| 1,129,782 | A | * | 2/1915 | Bissell et al. ................ 174/155 |
| 2,057,038 | A |   | 10/1936 | Lindquist et al. |
| 2,153,343 | A |   | 4/1939 | Ruscher |
| 2,303,950 | A |   | 12/1942 | Nordell |
| 3,216,025 | A |   | 11/1965 | Roll |
| 3,506,229 | A |   | 4/1970 | McDowell |
| 4,799,641 | A | * | 1/1989 | Koreski ...................... 248/68.1 |
| 4,993,670 | A |   | 2/1991 | Tesar |
| 5,145,214 | A | * | 9/1992 | Hunt ............................ 285/30 |
| 5,156,491 | A |   | 10/1992 | Russell |
| 5,303,481 | A |   | 4/1994 | Russell |
| 5,833,179 | A |   | 11/1998 | VandenBerg |
| 5,992,229 | A |   | 11/1999 | Pyotsia et al. |
| 5,992,439 | A | * | 11/1999 | McGill ...................... 137/15.03 |
| 5,992,802 | A | * | 11/1999 | Campbell ................... 248/68.1 |
| 6,227,502 | B1 | * | 5/2001 | Derman ...................... 248/74.4 |
| 6,241,200 | B1 | * | 6/2001 | Camporeale et al. ....... 248/68.1 |
| 6,435,565 | B2 | * | 8/2002 | Potts et al. .................. 24/16 R |

OTHER PUBLICATIONS

Schuler Manufacturing Company, Inc.; Schuler; 1995; 7 pages; Ohio.

R.W. Lyall & Company, Inc.; Steel Fabrication; Website; 1998; 2 pages; Corona, California.

* cited by examiner

Primary Examiner—Edward Lefkowitz
Assistant Examiner—Jewel V. Thompson
(74) Attorney, Agent, or Firm—Dunlap Codding & Rogers

(57) ABSTRACT

An adjustable meter loop assembly for connecting a gas meter to a gas supply line and a gas service line which includes a gas inlet conduit, a gas outlet conduit, and an adjustable brace. The gas inlet conduit is connectable to a gas inlet of the gas meter and the gas supply line. The gas outlet conduit is connectable to a gas outlet of the gas meter and the gas service line. The adjustable brace connects the gas inlet conduit to the gas outlet conduit. At least one of the gas inlet conduit and the gas outlet conduit is rotatable so as to permit the position of a second end of one of the gas inlet conduit and the gas outlet conduit to be selectively altered.

11 Claims, 4 Drawing Sheets

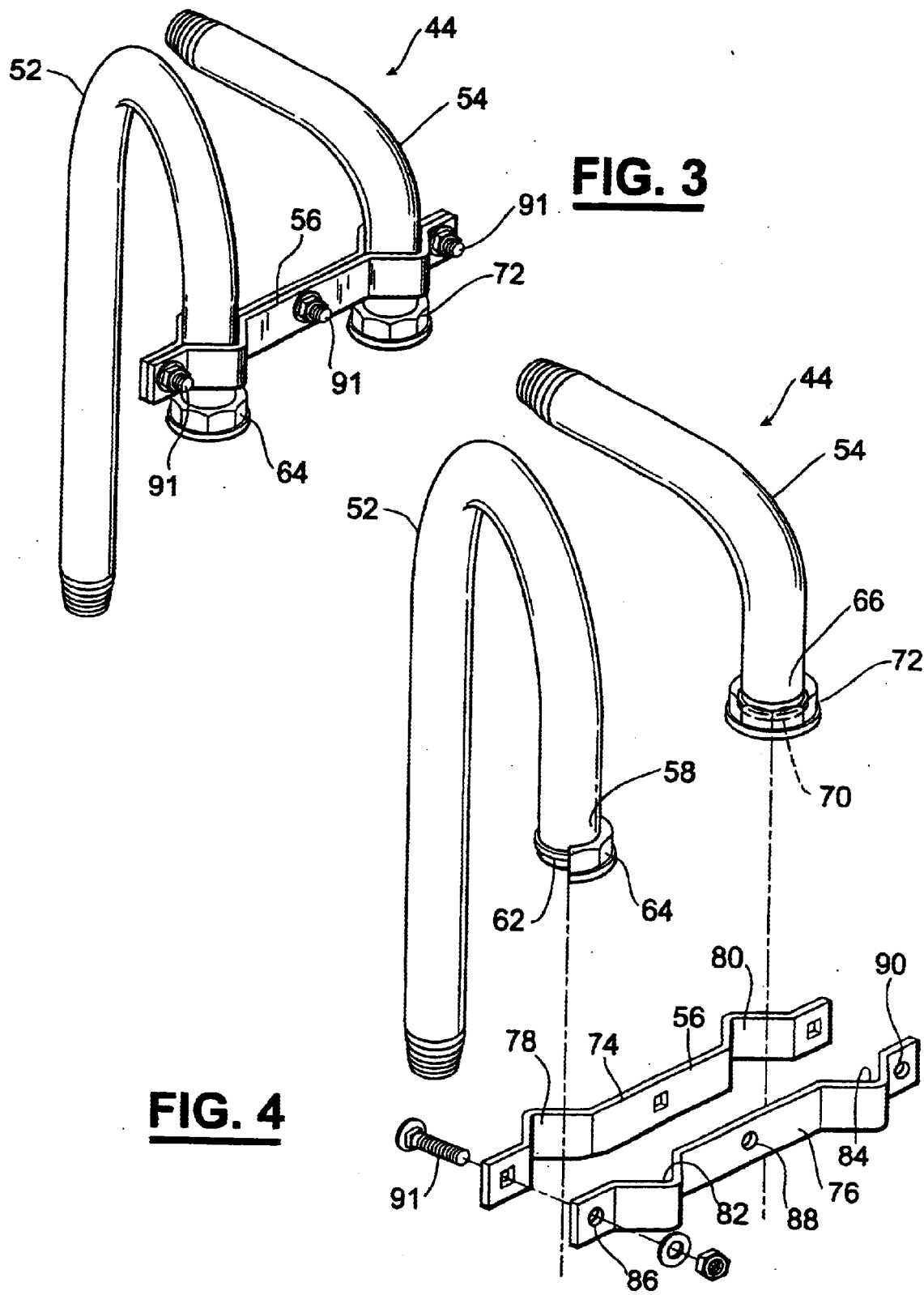

ADJUSTABLE METER LOOP ASSEMBLY

CROSS-REFERENCE TO RELATED APPLICATIONS

Not applicable.

BACKGROUND OF THE INVENTION

1. Field of the Invention

The present invention relates generally to piping for gas meters, and more particularly, but not by way of limitation, to an adjustable meter loop assembly.

2. Brief Description of the Related Art

Natural gas is a fuel used widely for industrial and domestic heating. To determine the amount of gas a customer consumes, a gas company interposes a gas meter in the gas line leading into each customer's dwelling. The gas meter connects a gas supply line leading from a gas supply to a gas service line extending to the point of use.

The gas supply line is generally buried underground and includes a riser that extends from the ground at the point where the gas meter is to be positioned. The riser also accommodates ancillary components, such as shut off valves and flow regulators. Similarly, the gas service line includes a riser that extends back into the ground, or the riser runs directly into the side of the dwelling. An inlet of the gas meter is connected to the riser of the gas supply line and an outlet of the gas meter is connected to the riser of the gas service line such that the gas meter is suspended between the two risers.

The connection between the inlet of the gas meter and the riser is often accomplished by using a series of nipples and elbows which results in the creation of multiple points of potential leaks. To overcome this problem, pre-fabricated meter loop assemblies have been proposed. Such meter loop assemblies are generally one piece manifolds used to connect the gas meter to the gas supply line and the gas service line. A typical meter loop assembly will include an inlet conduit, an outlet conduit, and a brace welded to the inlet conduit and the outlet conduit. A problem encountered with the use of the pre-fabricated meter loop assembly is the inability to make adjustments at a job site because of the rigidity of the meter loop assembly. If the gas service line extending from the dwelling is at a slight angle or if it is at the wrong location relative to the gas supply line, the meter loop assembly is difficult to install thus necessitating the repositioning of the meter loop assembly during installation which can only be done by moving the gas supply line, moving the gas service line, or adding new fittings which would be subject to leakage.

Another problem encountered with one piece meter loop assemblies is the amount of space required for shipping and storage. Because the meter loop assemblies are formed as one piece, they are incapable of being folded into a compact structure. This contributes to higher freight costs and additional storage requirements at warehouses and on installers' trucks.

To this end, a need exists for an adjustable meter loop assembly so that the relative position of the gas inlet and the gas outlet of the meter loop assembly may be selectively altered to facilitate installation, shipping, and storage of the meter loop assembly.

BRIEF DESCRIPTION OF THE SEVERAL VIEWS OF THE DRAWING

FIG. 3 is a perspective view of the meter loop assembly of the present invention.

FIG. 4 is an exploded, perspective view of the meter loop assembly of the present invention.

DETAILED DESCRIPTION OF THE INVENTION

Figure 1:
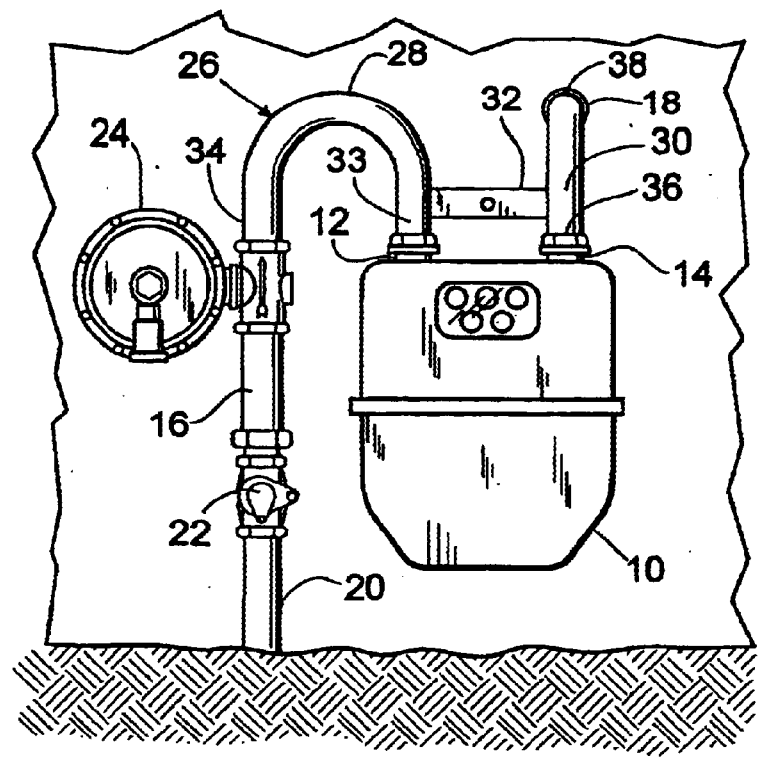
FIG. 1 is a front elevational view of a gas meter connected to a gas supply line and a gas service line with a prior art meter loop frame assembly.

Referring now to the drawings and more particularly to FIG. 1, a conventional gas meter 10 having an inlet 12 and an outlet 14 is shown interposed between a gas supply line 16 and a gas service line 18 for measuring the flow of gas passing from the gas supply line 16 to the gas service line 18. The gas supply line 16 is connected to a supply of gas and includes a riser 20 extending from the ground. The riser 20 is provided with a shut-off valve 22 and a pressure regulator 24. The gas service line 18 is connected to a point of use, such as a dwelling or the like.

In the past, the connection between the inlet of the gas meter and the riser was accomplished by using a series of unions (not shown) which results in the creation of multiple points of potential leaks. To overcome this problem, meter loop frame assemblies, also known as meter settings, have been used.

FIG. 1 illustrates an example of a prior art meter loop frame assembly 26 used to connect the gas meter 10 to the gas supply line 16 and the gas service line 18. The meter loop frame assembly 26 includes a gas inlet conduit 28, a gas outlet conduit 30, and a brace 32 which rigidly connects the gas inlet conduit 28 to the gas outlet conduit 30. The gas inlet conduit 28 has a first end 33 connectable to the inlet 12 of the gas meter 10 and a second end 34 connectable to the gas supply line 16. Similarly, the gas outlet conduit 30 has a first end 36 connectable to the outlet 14 of the gas meter 10 and a second end 38 connectable to the gas service line 18.

Figure 2:
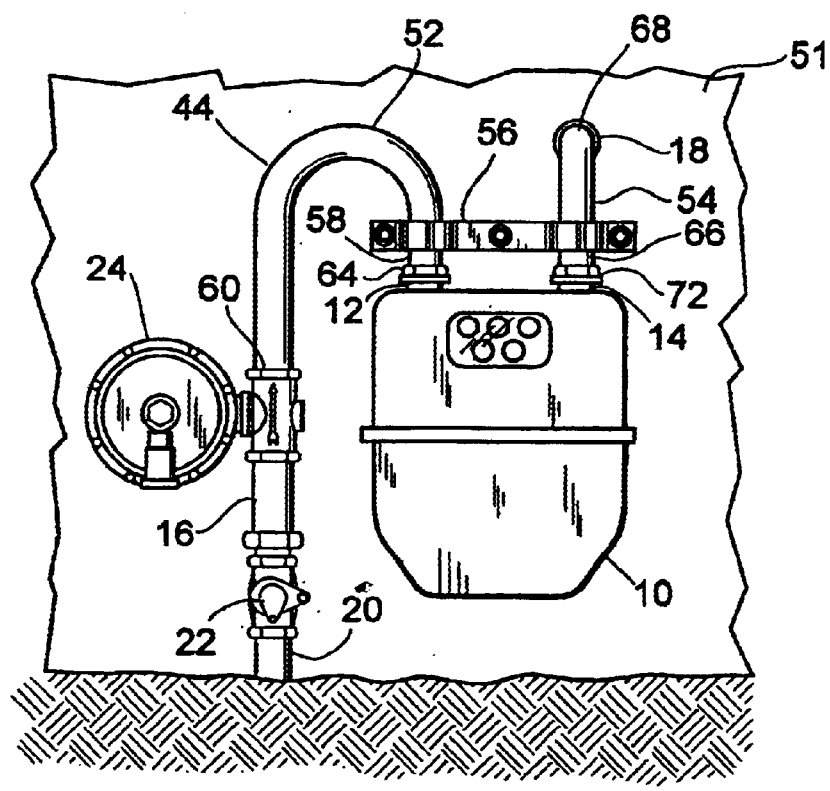
FIG. 2 is a front elevational view of a gas meter connected to a gas supply line and a gas service line with a meter loop assembly constructed in accordance with the present invention.

Referring now to FIGS. 2 and 3, the gas meter 10 of FIG. 1 is shown connected to the gas supply line 16 and the gas service line 18 using a meter loop assembly 44 constructed in accordance with the present invention. The gas supply line 16 includes the riser 20 which is provided with the shut-off valve 22 and the pressure regulator 24. The gas service line 18 is illustrated as extending directly into the side of a dwelling 51.

The meter loop assembly 44 includes a gas inlet conduit 52, a gas outlet conduit 54, and an adjustable brace 56 for connecting the gas inlet conduit 52 to the gas outlet conduit 54. The gas inlet conduit 52 has a first end 58 and a second end 60. The first end 58 is provided with a flange 62 (FIG. 4) which is adapted to be connected to the gas inlet 12 of the gas meter 10 with the use of a meter nut 64. The second end 60 of the gas inlet conduit 52 is threaded to facilitate connection to the gas supply line 16 in a conventional manner. Similarly, the gas outlet conduit 54 has a first end 66 and a second end 68. The first end 66 is provided with a flange 70 which is adapted to be connected to the gas outlet 14 of the gas meter 10 with the use of a meter nut 72. The second end 68 of the gas outlet conduit 54 is threaded to facilitate connection to the gas service line 18 in a conventional manner. It will be appreciated that the configuration of the ends of the gas inlet conduit 52 and the gas outlet conduit 54 can be varied depending on the type of connection to permit connection with a variety of different gas meters, gas supply lines, and gas service lines. Each of the gas inlet conduit 52 and the gas outlet conduit 54 is fabricated of a sufficiently rated piping material, such as a schedule 40 pipe.

As shown in FIG. 4, the adjustable brace 56 of the meter loop assembly 44 includes a first brace member 74 and a second brace member 76. Each of the first brace member 74 and the second brace member 76 is constructed of a rigid, durable material, such as steel, and coated with a polyester to prevent corrosion. The first brace member 74 has a first conduit receiving recess 78 formed near one end thereof and a second conduit receiving recess 80 formed near an opposite end thereof. Similarly, the second brace member 76 has a first conduit receiving recess 82 formed near one end and a second conduit receiving recess 84 formed near an opposite end. The first conduit receiving recess 78 and the second conduit receiving recess 80 of the first brace member 74 and the first conduit receiving recess 82 and the second conduit receiving recess 84 of the second brace member 76 are substantially V-shaped. The V-shape of the recesses 78, 80, 82, and 84 allows the adjustable brace 56 to be used with conduits of different diameters. However, it should also be understood and appreciated that the recesses 78, 80, 82, and 84 may be formed in any suitable shape so as to provide support for the gas inlet conduit 52 and the gas outlet conduit 54.

The adjustable brace 56 connects the gas inlet conduit 52 to the gas outlet conduit 54 of the meter loop assembly 44 so that the first end 58 of the gas inlet conduit 52 is spaced a distance from the first end 66 of the gas outlet conduit 54, the distance corresponding to the distance between the gas inlet 12 and the gas outlet 14 of the gas meter 10. The first brace member 74 is connectable to the second brace member 76 to hold the first end 58 of the gas inlet conduit 52 and the first end 66 of the gas outlet conduit 54 in a fixed position relative to one another. In use, the gas inlet conduit 52 of the meter loop assembly 44 is positioned in the first conduit receiving recesses 78 and 82 of the first and second brace members 74 and 76, respectively, and the gas outlet conduit 54 of the meter loop assembly 44 is positioned in the second conduit receiving recesses 80 and 84 of the first and second brace members 74 and 76, respectively. Thus, the first brace member 74 cooperates with the second brace member 76 to support the gas inlet conduit 52 and the gas outlet conduit 54 relative to one another. Each of the first brace member 74 and the second brace member 76 is provided with a plurality of holes 86, 88, and 90. A fastener 91, such as a carriage bolt, is placed through each of the holes connecting the first brace member 74 and the second brace member 76.

Upon loosening the fasteners 91, the gas inlet conduit 52 and the gas outlet conduit 54 are rotatable so as to permit the position of the second end 60 of the gas inlet conduit 52 and the second end 68 of the gas outlet conduit 54 to be selectively altered while the distance between the first end 58 of the gas inlet conduit 52 and the first end 66 of the gas outlet conduit 54 remains the same. Selectively altering the position of at least one of the gas inlet conduit 52 and the gas outlet conduit 54 of the meter loop assembly 44 facilitates connection of the second end 60 of the gas inlet conduit 52 to the gas supply line 16 and the second end 68 of the gas outlet conduit 60 to the gas service line 18.

Figure 5:
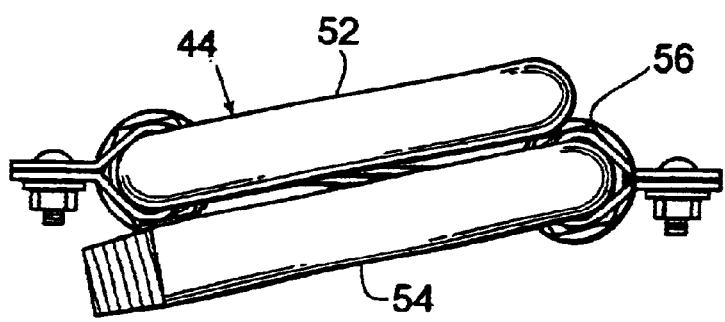
FIG. 5 is a top plan view of the meter loop assembly shown in a folded position.

FIG. 5 illustrates another advantage of the meter loop assembly 44 of the present invention. That is, the meter loop assembly 44 is shown in a folded storage and/or shipping configuration. The gas inlet conduit 52 and the gas outlet conduit 54 can each be rotated toward the adjustable brace 56 such that the gas inlet conduit 52 and the gas outlet conduit 54 are substantially parallel. This permits the meter loop assembly 44 to be more easily shipped, stored, and transported.

Figure 6:
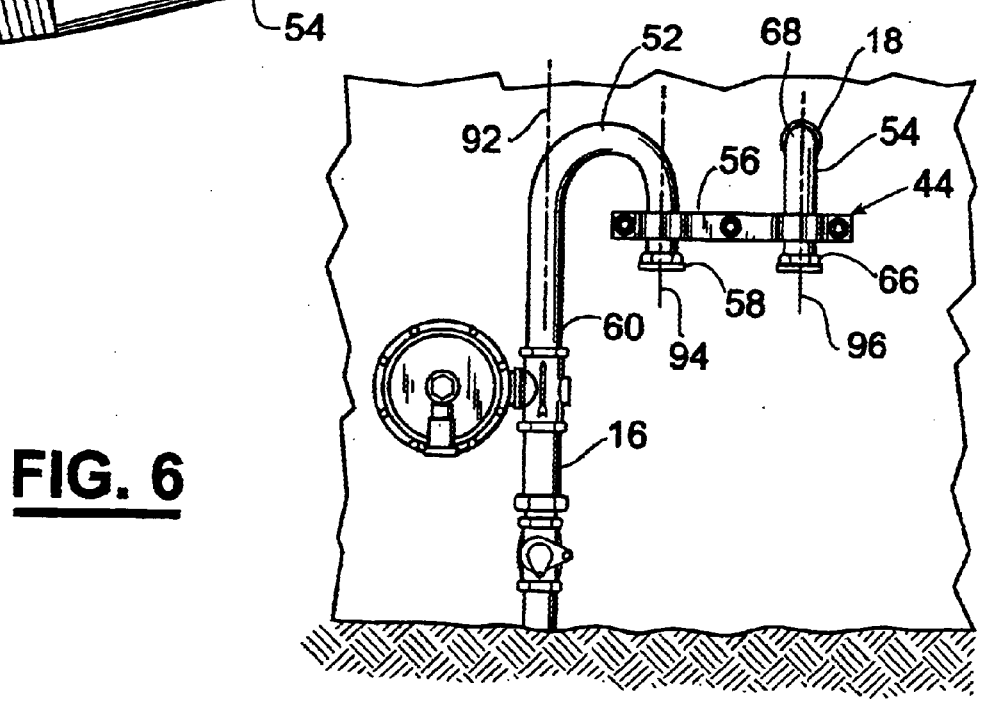
FIG. 6 is a front elevational view of the meter loop assembly shown with a gas outlet conduit attached to the gas supply line.
Figure 7:
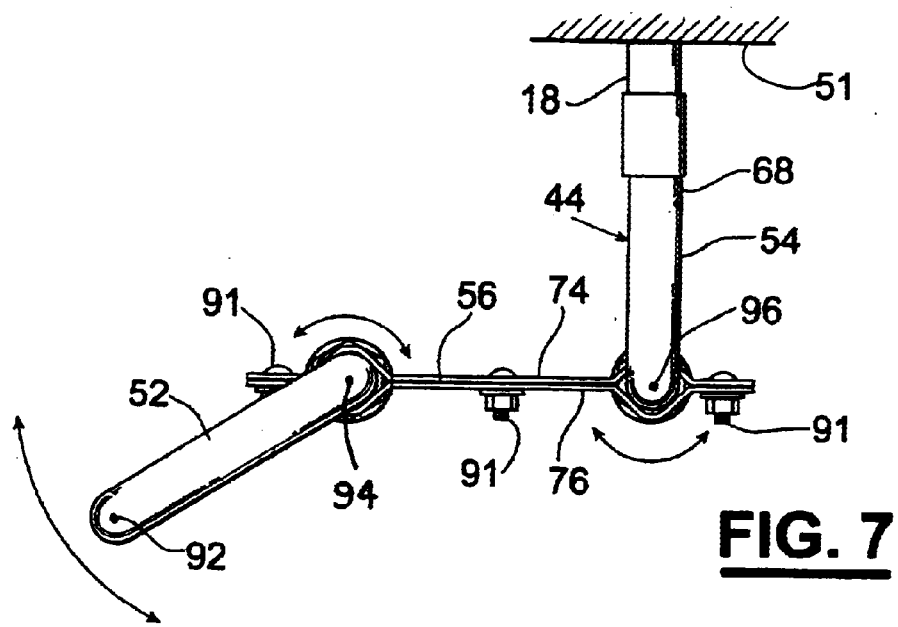
FIG. 7 is a top plan view of the meter loop assembly shown connected to the gas supply line and the gas service line without a gas meter.

FIGS. 6–9 illustrate the installation of the gas meter 10 using the meter loop assembly 44 of the present invention to connect the gas meter 10 to the gas supply line 16 and the gas service line 18. As shown in FIGS. 6 and 7, the locations where the gas supply line 16 extends from the ground and where the gas service line 18 extends from the dwelling 51 are generally fixed during the construction of the dwelling 51. When it is desired to initiate gas service to the dwelling 51, the gas meter 10 is connected to the gas supply line 16 and the gas service line 18. A problem encountered is that the gas supply line 16 and the gas service line 18 are usually not installed in the correct location and/or relationship relative to one another. In other words, the gas service line 18 may extend at a slight angle from the dwelling 51 or the horizontal relationship of the gas supply line 16 and the gas service line 18 may be different from one dwelling to the next. As such, the use of a pre-fabricated meter loop assembly with a fixed brace, such as the meter loop assembly 26 illustrated in FIG. 1, does not allow for quick and easy adjustments to be made to the meter loop assembly during installation.

FIGS. 6 and 7 illustrate that one of the primary advantages of the meter loop assembly 44 of the present invention is the ability to adjust the position of the gas inlet conduit 52 and the gas outlet conduit 54 at multiple points. More specifically, the meter loop assembly 44 provides three axes of rotation as depicted by reference numerals 92, 94, and 96 in FIGS. 6 and 7. The first axis of rotation 92 is defined by the axis of the gas supply line 16, the second axis of rotation 94 is defined is defined by the axis of the first end of the gas inlet conduit 52, and the third axis of rotation 96 is defined by the first end of the gas outlet conduit 54. The three axes of rotation 92, 94, and 96 permit a significant amount of horizontal adjustment of the meter loop 44 to be made by simply rotating the gas inlet conduit 52 and the gas outlet conduit 54. Once the required adjustments have been made to align the second end 60 of the gas inlet conduit 52 with the gas supply line 16 and the second end 68 of the gas outlet conduit 54 with the gas service line 18, the meter loop assembly 44 is connected to the gas supply line 16 and the gas service line 18 as illustrated in FIG. 6. The fasteners 91 are then tightened to hold the gas inlet conduit 52 and the gas outlet conduit 54 in fixed positions.

Figure 8:
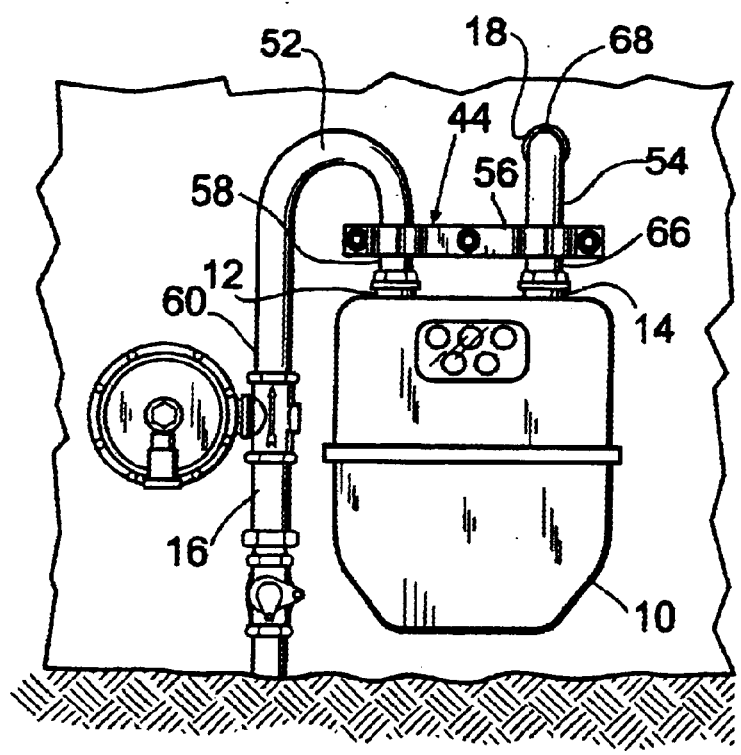
FIG. 8 is a front elevational view of the meter loop assembly shown connected to the gas supply line, the gas service line, and a gas meter.

Referring now to FIG. 8, with the gas inlet conduit 52 of the meter loop assembly 44 connected to the gas supply line 16 and the gas outlet conduit 54 of the meter loop assembly 44 connected to the gas service line 18, the gas meter 10 may be connected to the meter loop assembly 44 in a conventional manner.

Figure 9:
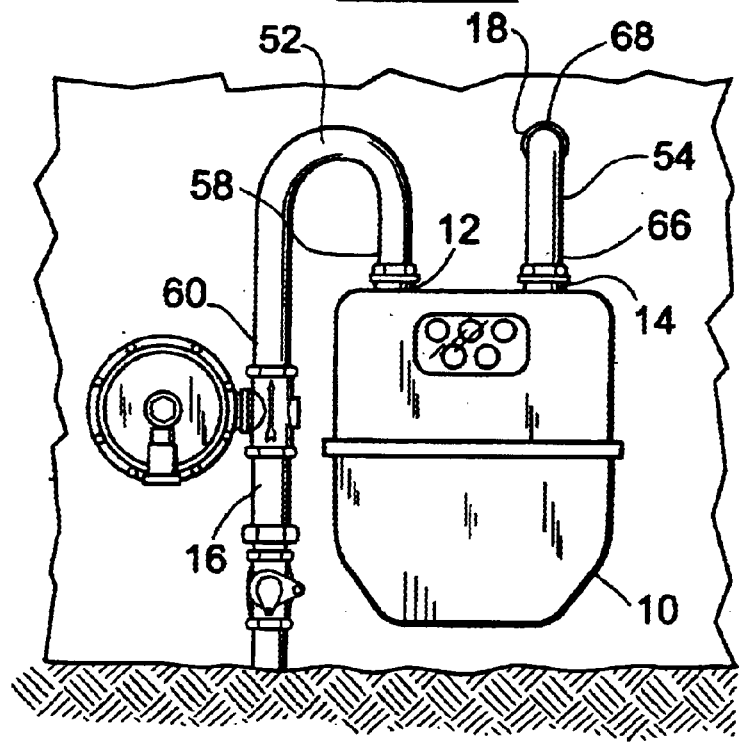
FIG. 9 is a front elevational view of the meter loop assembly shown connected to the gas supply line, the gas service line, and the gas meter with a brace of the meter loop assembly removed.

Although the meter loop assembly 44 has been shown as having the gas inlet conduit 52, the gas outlet conduit 54, and the adjustable brace 56, it should be understood that the adjustable brace 56 can be removed from the meter loop assembly 44, as shown in FIG. 9 after installation of the gas meter 10, if desired.

In addition to the adjustability of the meter loop assembly 44 of the present invention, the construction of the meter loop assembly 44 provides the additional advantage of superior corrosion protection. The manufacturing sequence for a meter loop assembly with a welded bracket requires the meter nuts to be assembled before welding and before painting. As a result, the meter nuts shield the ends of the gas inlet conduit and the gas outlet conduit so as to prevent them from being painted. Unfortunately, this is the area of the meter loop assembly most prone to corrosion and it is the most visible area above the gas meter. The construction of the meter loop assembly 44 permits the gas inlet conduit 52, the gas outlet conduit 54, and the meter nuts 64 and 72 to be painted prior to assembly thereby ensuring that each component of the meter loop assembly 44 is adequately protected against corrosion.

Along this same line, it is often desirable to injection mold nylon bushings on the ends of the gas inlet conduit 52 and the gas outlet conduit 54 to isolate the gas meter 10 from static electricity in the dwelling 51. Just as the ends under the meter nuts cannot be coated with paint if the meter loop assembly includes a welded brace, the end of the gas inlet conduit 52 and the gas outlet conduit 54 cannot be injection molded. However, because the gas inlet conduit 52 and the gas outlet conduit 54 of the meter loop assembly 44 are manufactured as separate components, the ends of the gas inlet conduit 52 and the gas outlet conduit 54 may be injection molded to provide a nylon bushing if desired.

From the above description it is clear that the present invention is well adapted to carry out the objects and to attain the advantages mentioned herein as well as those inherent in the invention. While presently preferred embodiments of the invention have been described for purposes of this disclosure, it will be understood that numerous changes may be made which will readily suggest themselves to those skilled in the art and which are accomplished within the spirit of the invention disclosed and as defined in the appended claims.

What is claimed is:

1. A meter loop assembly for connecting a gas meter to a gas supply line and a gas service line, the gas meter having a gas inlet and a gas outlet, the meter loop assembly comprising:

a gas inlet conduit having a first end and a second end, the first end of the gas inlet conduit connectable to the gas inlet of the gas meter and the second end of the gas inlet conduit connectable to the gas supply line;

a gas outlet conduit having a first end and a second end, the first end of the gas outlet conduit connectable to the gas outlet of the gas meter and the second end of the gas outlet conduit connectable to the gas service line; and an adjustable brace having a portion engaged with the gas inlet conduit between the first end and the second end of the gas inlet conduit and another portion engaged with the gas outlet conduit between the first end and the second end of the gas outlet conduit so as to connect the gas inlet conduit to the gas outlet conduit, the first end of the gas inlet conduit spaced a distance from the first end of the gas outlet conduit which corresponds to the distance between the gas inlet and the gas outlet of the gas meter, at least one of the gas inlet conduit and the gas outlet conduit being rotatable relative to the adjustable brace so as to permit the position of the second end of one of the gas inlet conduit and the gas outlet conduit to be selectively altered to facilitate connection of the second end of the gas inlet conduit to the gas supply line and the second end of the gas outlet conduit to the gas service line while the distance between the first ends of the gas inlet conduit and the gas outlet conduit remain the same.

2. The meter loop assembly of claim 1 wherein the adjustable brace comprises:

a first brace member having a first conduit receiving recess formed near one end thereof and a second conduit receiving recess formed near an opposite end thereof; and a second brace member having a first conduit receiving recess formed near one end thereof and a second conduit receiving recess formed near an opposite end thereof, the second brace member connectable to the first brace member such that the gas inlet conduit of the meter loop assembly is positioned in the first conduit receiving recesses of the first and second brace members and the gas outlet conduit of the meter loop assembly is positioned in the second conduit receiving recesses of the first and second brace members whereby the first brace member cooperates with the second brace member to support the gas inlet conduit and the gas outlet conduit relative to one another.

3. The meter loop assembly of claim 2 wherein the first brace member is connectable to the second brace member to hold the first end of each of the gas inlet conduit and the gas outlet conduit in a fixed position relative to one another.

4. The meter loop assembly of claim 3 wherein each of the first and second conduit receiving recesses of the first brace member and each of the first and second conduit receiving recesses of the second brace member are substantially V-shaped.

5. A method for forming a meter loop assembly for connecting a gas meter to a gas supply line and a gas service line, the gas meter having a gas inlet and a gas outlet, the method comprising:

providing a gas inlet conduit having a first end and a second end, the first end of the gas inlet conduit connectable to the gas inlet of the gas meter and the second end of the gas inlet conduit connectable to the gas supply line;

providing a gas outlet conduit having a first end and a second end, the first end of the gas outlet conduit connectable to the gas outlet of the gas meter and the second end of the gas outlet conduit connectable to the gas service line; and connecting the gas inlet conduit to the gas outlet conduit between the first and the second ends of the gas inlet conduit and the first and second ends of the gas outlet conduit such that the first end of the gas inlet conduit is spaced a distance from the first end of the gas outlet conduit which corresponds to the distance between the gas inlet and the gas outlet of the gas meter and such that at least one of the gas inlet conduit and the gas outlet conduit is rotatable so as to permit the position of the second end of one of the gas inlet conduit and the gas outlet conduit to be selectively altered to facilitate connection of the second end of the gas inlet conduit to the gas supply line and the second end of the gas outlet conduit to the gas service line while the distance between the first ends of the gas inlet conduit and the gas outlet conduit remain the same.

6. The method of claim 5 wherein the step of connecting the inlet conduit to the outlet conduit comprises:

providing a first brace member having a first conduit receiving recess formed near one end thereof and a second conduit receiving recess formed near an opposite end thereof;

providing a second brace member having a first conduit receiving recess formed near one end thereof and a second conduit receiving recess formed near an opposite end thereof; and connecting the second brace member to the first brace member with the gas inlet conduit positioned in the first conduit receiving recesses of the first brace member and of the second brace member and the gas outlet conduit positioned in the second conduit receiving recesses of the first brace member and of the second brace member such that the first brace member cooperates with the second brace member to support the gas inlet conduit and the gas outlet conduit relative to one another.

7. The method of claim 6 wherein, in the step of providing the first and second brace members, the first and second conduit receiving recesses of the first brace member and the first and second conduit receiving recesses of the second brace member are substantially V-shaped.

8. A method for connecting a gas meter to a gas supply line and a gas service line, the gas meter having a gas inlet and a gas outlet, the method comprising:

providing a meter loop assembly, the meter loop assembly comprising:

a gas inlet conduit having a first end and a second end, the first end of the gas inlet conduit connectable to the gas inlet of the gas meter and the second end of the gas inlet conduit connectable to the gas supply line;

a gas outlet conduit having a first end and a second end, the first end of the gas outlet conduit connectable to the gas outlet of the gas meter and the second end of the gas outlet conduit connectable to the gas service line; and an adjustable brace having a portion engaged with the gas inlet conduit between the first end and the second end of the gas inlet conduit and another portion engaged with the gas outlet conduit between the first end and the second end of the gas outlet conduit so as to connect the gas inlet conduit to the gas outlet conduit, the first end of the gas inlet conduit is spaced a distance from the first end of the gas outlet conduit which corresponds to the distance between the gas inlet and the gas outlet of the gas meter, at least one of the gas inlet conduit and the gas outlet conduit being rotatable relative to the adjustable brace so as to permit the position of the second end of one of the gas inlet conduit and the gas outlet conduit to be selectively altered to facilitate connection of the second end of the gas inlet conduit to the gas supply line and the second end of the gas outlet conduit to the gas service line while the distance between the first ends of the gas inlet conduit and the gas outlet conduit remain the same;

rotating at least one of the gas inlet conduit and the gas outlet conduit so as to align the second end of the gas inlet conduit with the gas supply line and the second end of the gas outlet conduit with the gas service line;

connecting the second end of the gas inlet conduit to the gas supply line;

connecting the second end of the gas outlet conduit to the gas service line; and connecting the inlet of the gas meter to the first end of the gas inlet conduit and the outlet of the gas meter to the first end of the gas outlet conduit.

9. The method of claim 8 further comprising the step of removing the adjustable brace from the gas inlet conduit and the gas outlet conduit after connecting the second end of the gas inlet conduit to the gas supply line and the second end of the gas outlet conduit to the gas service line.

10. The method of claim 8 wherein the step of connecting the inlet conduit to the outlet conduit comprises:

providing a first brace member having a first conduit receiving recess formed near one end thereof and a second conduit receiving recess formed near an opposite end thereof;

providing a second brace member having a first conduit receiving recess formed near one end thereof and a second conduit receiving recess formed near an opposite end thereof; and connecting the second brace member to the first brace member with the gas inlet conduit positioned in the first conduit receiving recesses of the first brace member and of the second brace member and the gas outlet conduit positioned in the second conduit receiving recesses of the first brace member and of the second brace member such that the first brace member cooperates with the second brace member to support the gas inlet conduit and the gas outlet conduit relative to one another.

11. The method of claim 8 wherein, in the step of providing the first and second brace members, the first and second conduit receiving recesses of the first brace member and the first and second conduit receiving recesses of the second brace member are substantially V-shaped.

* * * * *